United States Patent [19]

Riihinen

[11] 4,301,582
[45] Nov. 24, 1981

[54] ROLLER MAGNETICALLY COMPENSATED AND ADJUSTED FOR DEFLECTION

[75] Inventor: Jaakko Riihinen, Jyväskylä, Finland

[73] Assignee: Valmet Oy, Finland

[21] Appl. No.: 85,297

[22] Filed: Oct. 16, 1979

[30] Foreign Application Priority Data

Oct. 19, 1978 [FI] Finland ................................. 783191

[51] Int. Cl.³ ........................ B21B 13/02; B21B 13/14
[52] U.S. Cl. ............................................. 29/116 AD
[58] Field of Search ...... 29/116 AD, 116 R, 113 AD, 29/132; 100/168, DIG. 17

[56] References Cited

U.S. PATENT DOCUMENTS 3,456,582 7/1969 McClenathan ............ 29/116 AD X
3,489,079 1/1970 Aurich et al. ......................... 100/168
4,062,097 12/1977 Riihinen ........................ 29/116 AD Primary Examiner—Peter P. Nerbun
Attorney, Agent, or Firm—Steinberg & Raskin

[57] ABSTRACT

A roller, magnetically compensated and adjusted for deflection, has a non-rotating axle with ends having a load imposed thereat and a cylindrical shell rotatably supported by bearings on the axle. A magnetic core is formed in the axle and has in transverse section a plurality of pole shoes spaced from the shell by an air gap. A plurality of electromagnetic windings, each wound on the core at a corresponding one of the pole shoes, produce a magnetic force in a manner whereby the magnetic flux through the air gap between the pole shoes and the shell produces a compensating force field between the shell and the core.

10 Claims, 6 Drawing Figures

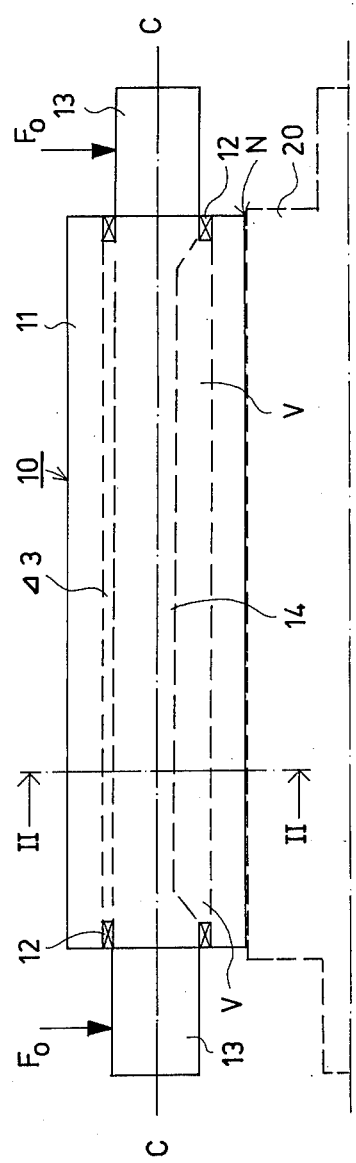
FIG. 1
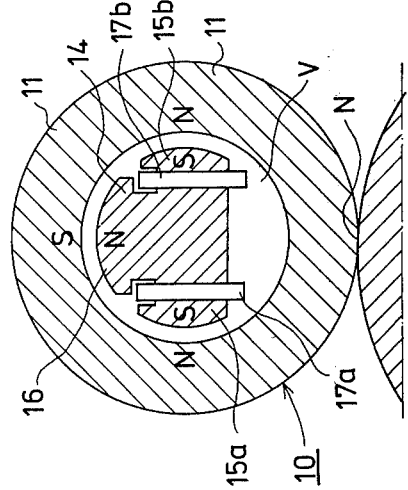
FIG. 2A
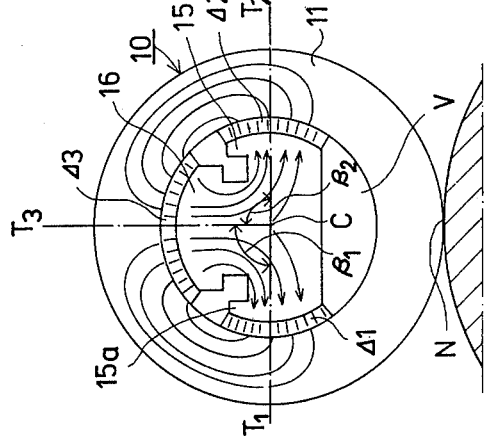
FIG. 2B
FIG. 2C

ROLLER MAGNETICALLY COMPENSATED AND ADJUSTED FOR DEFLECTION

BACKGROUND OF THE INVENTION

The present invention relates to a roller. More particularly, the invention relates to a roller compensated and/or adjusted with respect to its deflection.

The roller is a press roller or calender roller in a paper machine. A load is imposed at the ends of the roller. The roller has a non-rotating axle, at the ends of which the load is imposed, and a cylindrical shell supported by bearings on the axle. The roller axle is made to form a magnetic core, in which devices which produce the magnetomotive force are arranged in such a way that the magnetic flux through the air gap between the pole shoes of the magnetic core and the roller shell brings about a compensating force field between said shell and said magnetic core.

The roller of the invention is intended to be used in the pressure treatment of web-like sheet material, when defining a nip in association with a mating roller.

It is generally well known that rollers of the aforedescribed type, particularly when loaded by the imposition of a load at their ends, suffer deflection, so that the linear pressure at the press nip is greater at the region of the outer ends of the nip than at the central region of the nip. Attempts have been made to avoid this drawback by providing the rollers with a convex exterior surface. When using conventional convex rollers, however, it is possible to obtain, for example, a uniform linear pressure only with a given load. In order to avoid this drawback, it has been proposed to provide for controllable convex rollers. An example of a controllable convex roller is the known Kusters roller (U.S. Pat. No. 2,908,964), wherein a pressure fluid chamber is situated between the stationary roller axle and the outer rotating roller shell at a selected sector thereof. It is possible to compensate for the deflection of the roller shell by controlling the pressure in the pressure fluid chamber. However, the Kusters roller suffers from the drawback of having sealing difficulties accompanied by unavoidable leakage of pressure fluid. Another drawback of the Kusters roller is that it responds relatively slowly to changes of pressure; an interval of approximately 30 seconds being required for an increase in pressure while an interval of approximately 10 seconds is required for a decrease in pressure to be effected. The consequence of these drawbacks is that when there is a change in pressure a considerable quantity of paper is wasted when such a roller is used in paper machines.

There are known deflection-compensated rollers such as the so-called CC roller of the Beloit Co. In the CC roller, pressure shoes frictionally rub against the inner surface of the roller shell and a load is imposed on these shoes via a pressurized fluid. In addition, it is relatively difficult to provide controls capable of achieving asymmetrical effects axially on the roller. Compensating forces are provided via pressure fluid chambers or friction shoes which make high demands on the smoothness of the inner surface of the press shell. This adds to the manufacturing costs of the CC roller.

Press rollers which use electromagnetic forces are also known and the objective of the present invention is to further develop such rollers. In this connection, reference may be made to U.S. Pat. No. 3,456,582. However, the roller disclosed in this patent, in addition to the fact that it differs from the present invention in its details, is also different in principle in that in said U.S. patent the roller is not loaded at its ends.

DT-OS No. 1,761,641 discloses a deflection-compensated roller utilizing permanent magnets. The roller includes permanent magnets in association with both the fixed axle and the rotating shell. The compensating forces are adjusted by axially adjusting the mutual position of the roller axle and the shell. This changes the position of the roller shell with respect to the permanent magnets in the axle with the result that the compensating forces are simultaneously adjusted.

In applicant's Finnish Pat. No. 52,394 (related U.S. Pat. No. 4,062,097), deflection-compensation of a magnetic roller is achieved by creating a magnetomotive force via devices arranged in association with the two essentially coaxial cylindrical parts. Another device is provided in association with the roller axle for producing a magnetomotive force between the opposite sectors of the roller axle. The combined action of the magnetic fields produced by the magnetomotive force attracts the axle and shell to each other on one side and repels the axle and shell from each other on the opposite side.

The present invention is most clearly similar to Finnish patent application No. 2283/67, corresponding to U.S. Pat. No. 3,489,079. In the roller described in this publication, there is a magnetic shoe device of V-shape which creates an attractive force at the two air gaps between the two poles of the magnetic shoe device and the inner shell of the roller. In this device, the angle between the magnetic shoes is relatively small, so that the effective air gap is relatively small and a considerable part of the inner shell of the roller is inefficiently used.

SUMMARY OF THE INVENTION

The principal object of the invention is to provide a new and improved roller which eliminates the drawbacks of known rollers.

An object of the invention is to provide a roller having a more rapid adjustment speed than the Kusters and CC rollers.

Another object of the invention is to provide a roller which is more economical than known mechanically and hydraulically compensated rollers, especially in that there are no specific requirements for the smoothness of the inner surface of the shell, since there is neither direct contact nor a need for sealing.

Still another object of the invention is to provide a roller which is advantageous from the point of view of energy requirements, due to the eddy-current losses caused by the magnetic field being lower than the friction losses caused by the longitudinal seals.

Yet another object of the invention is to provide a roller structure, compared with known magnetically compensated rollers, which makes it possible to adjust the nip pressure more accurately than before and to use higher compensating forces than before. This object has recently become urgent, since the nip pressures of the presses and calender rollers of paper machines have increased, and the rollers have also become longer.

In order to attain the aforedescribed objects and in accordance with the invention, the magnetic core, in its transverse section, is provided with three pole shoes. Magnetizing electromagnetic windings on the magnetic core produce a magnetomotive force in such a way that the magnetic flux causing the actual compensating force field runs through the center pole shoe of the magnetizing core and is closed back to the magnetizing core via the shell of the roller and the two pole shoes of the magnetizing core. The two pole shoes are essentially opposite each other.

In accordance with the invention, a roller magnetically compensated and adjusted for deflection has a non-rotating axle with ends having a load imposed thereat and a cylindrical shell rotatably supported by bearings on the axle. The roller comprises a magnetic core formed in the axle and having in transverse section a plurality of pole shoes spaced from the shell by an air gap. A plurality of electromagnetic windings, each wound on the core at a corresponding one of the pole shoes, produce a magnetomotive force in a manner whereby the magnetic flux through the air gap between the pole shoes and the shell produces a compensating force field between the shell and the core.

The core has in transverse section three pole shoes, including a pair of spaced pole shoes substantially opposite each other and a center pole shoe equidistantly spaced from the pair of pole shoes. The magnetic flux which produces the compensating force field passes through the center pole shoe and the core and is returned to the core via the shell and the pair of pole shoes.

The transverse section of the core is substantially T-shaped.

The center pole shoe actually produces the compensating force field and extends over the entire length of the axle.

Each of the pair of pole shoes consists of a plurality of separate spaced parallel pole shoes each having a corresponding one of the electromagnetic windings wound thereon.

The axle has an axis coincident with the axis of rotation of the shell. The pair of pole shoes have a plane of symmetry passing substantially through the axis of rotation. The center pole shoe has a plane of symmetry substantially perpendicular to the plane of symmetry of the pair of pole shoes and passing substantially through the axis of rotation.

Magnetizing currents are supplied separately to each of the electromagnetic windings in a manner whereby the distribution of the linear pressure load in the nip between the roller and a mating roller is adjusted as desired by adjustment of the intensities and mutual relations of the currents.

The core has a sector greater than 180° and each of the pole shoes is spaced from the shell by a corresponding active air gap. The sector is approximately 270°. An insulating gap is provided between the core and the shell at the sector and spaced from the air gaps of the pole shoes.

BRIEF DESCRIPTION OF THE DRAWINGS

For a fuller understanding of the invention, reference is had to the following description taken in connection with the accompanying drawings, in which:

FIG. 1 is a schematic side view of an embodiment of the roller of the invention;

FIG. 2A is a sectional view, on an enlarged scale, taken along the lines II—II, of FIG. 1, showing the magnetic flux;

FIG. 2B is a sectional view, on an enlarged scale, taken along the lines II—II, of FIG. 1, showing the magnetizing electromagnetic windings;

FIG. 2C is a sectional view, on an enlarged scale, taken along the lines II—II, of FIG. 1, showing the degree and direction of magnetic forces between the magnetic core and the roller shell;

DESCRIPTION OF PREFERRED EMBODIMENTS

Figures 3, 4:
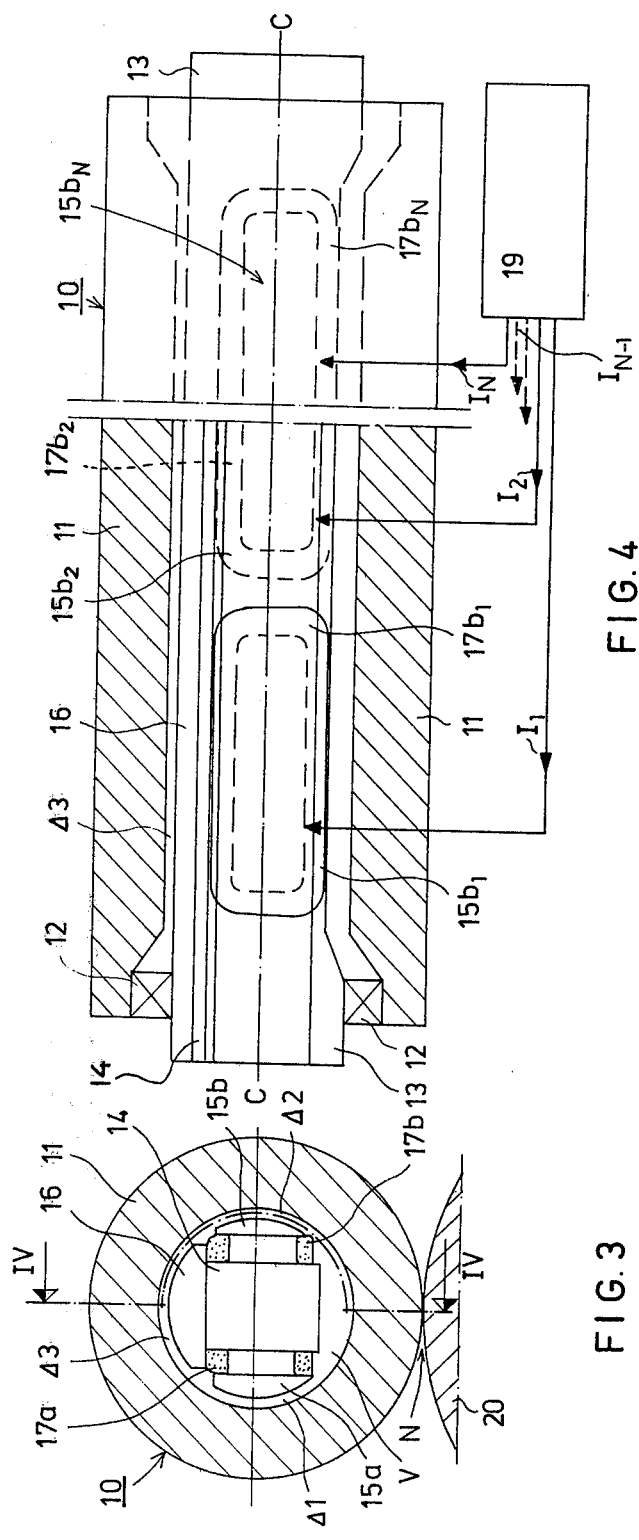
FIG. 3 is a cross-sectional view of the embodiment of FIG. 1.
FIG. 4 is a sectional view, taken along the lines IV—IV, of FIG. 3.

The electromagnetically compensated roller 10 of the invention, illustrated in the FIGS., comprises a cylindrical shell section 11. At least the inner part of the shell 11 is made of magnetically conductive soft material, and the outer part is, when required, fitted with a magnetically non-conductive coating, as required by the specific application. The roller comprises a fixed axle 13, loaded at its ends. The loading forces $F_0$ are indicated in FIG. 1. The forces $F_0$, together with the weight of the roller, provide for the required nip pressure at the nip N formed by the roller 10 and the mating roller 20. The rotating roller shell 11 is fitted in position via bearings 12. The center line or axis of the axle 13, 14 is indicated by C—C in FIGS. 1 and 4.

The fixed axle 13 of the roller 10 is made of magnetically conducting material to form a magnetic core 14. The magnetic core 14 is essentially T-shaped in section and has pole shoes 15a and 15b fitted with magnetizing electromagnetic windings 17a and 17b, respectively. A wider pole shoe 16, common to the pole shoes 15a and 15b, also may be fitted with a magnetizing electromagnetic winding although this is not shown in the Figs.

The magnetic core 14 is installed within the rotating roller shell 11 in a manner whereby air gaps $\Delta 1$ and $\Delta 2$ are formed between the opposite pole shoes 15a and 15b and the inner surface of the roller shell and an air gap $\Delta 3$ is formed between the pole shoe 16 and said inner surface. As shown in FIG. 2A, the air gaps $\Delta 1$ and $\Delta 2$ are in a plane of symmetry $T_1$-$T_2$ passing through the axis of rotation C—C of the roller. The plane of symmetry $T_3$ of the air gap $\Delta 3$ forms angles $\beta_1$ and $\beta_2$ with the plane $T_1$-$T_2$. The angles $\beta_1$ and $\beta_2$ of FIG. 2 are right angles, although they may deviate slightly from right angles.

FIG. 2A schematically illustrates how the magnetic flux runs in the air gaps $\Delta 1$, $\Delta 2$ and $\Delta 3$ and in the roller shell 11. A magnetic flux distribution of the type shown in FIG. 2A brings about forces $F_1$, $F_2$ and $F_3$ shown schematically in FIG. 2C. The force $F_3$ is the active force which, since it influences the air gap $\Delta 3$, compensates for the deflection caused by the weight of the roller 10 and the load $F_0$, and also distributes the linear pressure, as desired, in the nip N between said roller and the mating roller 20.

An insulating gap V is provided beneath the magnetic core 14. The gap V principally guides the magnetic flux via the air gaps $\Delta 1$, $\Delta 2$ and $\Delta 3$.

A sector $\alpha$, having a width of 270°, is shown in FIG. 2C. In accordance with the invention, it is possible to use the sector $\alpha$ in producing the compensating magnetic forces on an industrial scale.

As shown in FIG. 4, the pole shoe which produces the principal compensating force F extends over the entire width of the shell 11 of the roller 10. On the contrary, there are a plurality of pole shoes 15a, side by side, and a plurality of pole shoes 15b, side by side, each fitted with a separate magnetizing electromagnetic winding 17. FIG. 4 shows the pole shoes $15b_1$, $15b_2$ ... $15b_N$, and the magnetizing electromagnetic windings $17b_1$, $17b_2$ ... $17b_N$ wound on said pole shoes, respectively. There are thus N parallel pole shoes 15.

The compensation and adjustment of the deflection, and consequently the distribution of the linear pressure at the nip N, may be electrically controlled by controlling the intensities of the magnetizing currents supplied to the electromagnetic windings $17a_1, b_1 \ldots 17a_N, b_N$ and the relations between these currents. In FIG. 4, this procedure is illustrated by a block 19, which produces currents $I_1, I_2 \ldots I_{N-1}, I_N$. In some cases, it is sufficient that windings 17 are connected in series, and the current through such group of windings is adjusted. The magnetizing may be accomplished either with direct current or alternating current. When direct current is used, controlled rectifiers are also used. Since the magnetizing current is only conducted to the fixed magnetizing shoe, no slip rings or similar devices are required.

Since only a fixed magnetic core 14 has been hereinbefore discussed, it may be readily understood that, when required, said core may be turned around the axis of rotation C—C to permit variation of the location of the area of influence of the compensating forces, as described. An adjustment may also be provided in which the width of the air gap, particularly the air gap Δ3, is adjustable in certain limits. Since the magnetizing shoes 15 and 16 do not directly contact the inner surface of the shell 11 of the roller, there are no special requirements for the smoothness of said surface.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A roller magnetically compensated and adjusted for deflection, said roller having a non-rotating axle with ends having a load imposed thereat and a cylindrical shell rotatably supported by bearings on the axle, said roller comprising a magnetic core formed in said axle and having in transverse section a plurality of pole shoes spaced from said shell by an air gap, at least a part of said shell being made of magnetically conductive material; and a plurality of electromagnetic windings each wound on said core at a corresponding one of said pole shoes for producing a magnetomotive force in a manner whereby the magnetic flux through the air gap between the pole shoes and the shell produces a compensating force field between said shell and said core.

2. A roller as claimed in claim 1, wherein said core has in transverse section at least three pole shoes, including a pair of spaced pole shoes substantially opposite each other and a center pole shoe substantially equidistantly spaced from the pair of pole shoes, and said magnetic flux which produces the compensating force field passes through the center pole shoe of said core and is returned to said core via said shell and said pair of pole shoes.

3. A roller as claimed in claim 1, wherein the transverse section of said core is substantially T-shaped.

4. A roller as claimed in claim 2, wherein said center pole shoe actually produces the compensating force field and extends over the entire length of said axle.

5. A roller as claimed in claim 2, wherein each of said pair of pole shoes consists of a plurality of separate spaced parallel pole shoes each having a corresponding one of said electromagnetic windings wound thereon.

6. A roller as claimed in claim 2, wherein said axle has an axis coincident with the axis of rotation of said shell, said pair of pole shoes have a plane of symmetry passing substantially through said axis of rotation and said center pole shoe has a plane of symmetry substantially perpendicular to the plane of symmetry of said pair of pole shoes and passing substantially through said axis of rotation.

7. A roller as claimed in claim 3, wherein said core has a sector greater than 180° and each of said pole shoes is spaced from said shell by a corresponding active air gap.

8. A roller as claimed in claim 5, further comprising means for supplying magnetizing currents separately to each of said electromagnetic windings in a manner whereby the distribution of the linear pressure load in the nip between said roller and a mating roller is adjusted as desired by adjustment of the intensities and mutual relations of said currents.

9. A roller as claimed in claim 7, wherein the sector is approximately 270°.

10. A roller as claimed in claim 7, further comprising an insulating gap between said core and said shell at said sector and spaced from the air gaps of said pole shoes.

* * * * *